United States Patent [19]  [11] Patent Number: 4,594,901

Norman  [45] Date of Patent: Jun. 17, 1986

[54] ELECTROSTATIC FLOW METER

[75] Inventor: Eugene Norman, Green Bay, Wis.

[73] Assignee: Kimberly-Clark Corporation, Neenah, Wis.

[21] Appl. No.: 669,966

[22] Filed: Nov. 9, 1984

[51] Int. Cl.[4] .............................................. G01F 1/64
[52] U.S. Cl. ................................ 73/861.04; 73/861.09
[58] Field of Search ........... 73/861.04, 861.08, 861.09; 324/453, 454

[56]  References Cited

U.S. PATENT DOCUMENTS

| 2,315,805 | 4/1943 | Mayo et al. | 73/861.08 |
| 2,491,445 | 12/1949 | Cunningham et al. | 73/861.09 |
| 3,184,967 | 5/1965 | Rogers | 73/861.09 |
| 3,359,796 | 12/1967 | Dimick | 73/861.09 |

FOREIGN PATENT DOCUMENTS

| 487354 | 12/1929 | Fed. Rep. of Germany | 73/861.09 |
| 2034902 | 9/1978 | United Kingdom | 324/454 |

Primary Examiner—Herbert Goldstein
Attorney, Agent, or Firm—Gregory E. Croft

[57]  ABSTRACT

The mass flow rate of particles conveyed by a gaseous medium through a conduit is measured by an electrostatic flow meter comprising a grounded electrical conductor in contact with a semiconductive static charge-generating element exposed to the moving particles. As the particles pass the semi-conductive, static charge-generating element, they impart a static charge to the element which is transferred by the conductor to ground. The resulting current, which can be measured by any suitable current measuring means, is proportional to the mass flow rate of the particles.

4 Claims, 2 Drawing Figures

ELECTROSTATIC FLOW METER

BACKGROUND OF THE INVENTION

1. Field of the Invention

This invention relates to a method and apparatus for measuring the mass of fibrous particulates being transported through or with a gaseous medium.

2. Description of the Prior Art

Several apparatus are available for determining the mass of particles being transported in or through a gas. Green et al. ("A Low Cost Solids Flow Meter for Industrial Use,"*Journal of Physics E: Scientific Instruments*, Vol. 22, No. 10, October, 1978, pp. 1005-1010), describes an instrument for measuring the mass flow rate of dry conducting or nonconducting granular solids or powder. As solids are transported into and through a capacitor formed by the walls of a conveyor, the dielectric constant of the air in the field of the capacitor changes and the change is converted to an electrical signal that may be correlated with the mass flow of the solids.

West German Auslegeschrift No. 1,121,822, issued on Jan. 11, 1962, to Moller et al., discloses an apparatus for measuring the quantity of material conveyed in a gas through a pipeline. A wire extends along the axis of the pipeline, and an electric field is produced between the wire and the pipe wall. The wire is connected to a capacity-measuring bridge, and changes in the electric field are related to the solids flow between the wire and pipe wall.

U.S. Pat. No. 4,312,180 issued to Reif et al. on Jan. 26, 1982, and entitled "Detecting Particles," describes an apparatus comprising a pair of electrically conductive members spaced apart and means for providing an electrical potential adjacent one of the members. This potential produces ions which transmit a charge to particles being transported past the ion-producing member. The charged particles are moved downstream within the apparatus and detected by charge detecting means.

Also somewhat related is U.S. Pat. No. 3,478,261 to Forster et al., which teaches a means for measuring static charge in a pipe carrying a liquid hydrocarbon steam comprising a pair oppositely-charged electrodes in the pipe, a bias voltage source, a ground connected to the negative side of the bias voltage, and a pair of electrometers between the electrodes and the ground. The algebraic sum of the currents flowing from the two electrodes to the ground indicates the amount of static charge.

However, none of the prior art teaches a simple means for detecting the mass flow rate of particles in a conduit by simply measuring electrostatic current resulting from static charge formation.

SUMMARY OF THE INVENTION

In general, the invention resides in the discovery that certain particles being conveyed through a conduit by a gaseous medium can be made to generate a measurable electrostatic current which is proportional to the mass flow rate of the particles through the conduit. A uniform distribution of particles in the conduit is not necessary. Particles for which this discovery is applicable particularly include cellulosic fibers and fragments which are commonly conveyed by air streams in industrial processes.

More specifically, the invention resides in a method for indirectly measuring the mass flow rate of particles transported through a conduit by a gaseous medium comprising: (a) exposing the surface of a semi-conductive material to the flow of particles in the conduit, wherein static charges are formed on said surface; (b) dissipating the static charges from said surface through an electrical conductor, wherein the resulting electrical current is proportional to the mass flow rate of particles through the conduit; and (c) measuring the current.

In a further aspect, the invention resides in an electrostatic flowmeter for measuring the flow of particulates transported within a conduit by a gaseous medium comprising: (a) a semiconductive static charge-generating element, electrically insulated from the conduit, having a surface on which static charges are generated when exposed to the flow of particulates; (b) a grounded electrical conductor, electrically insulated from the conduit, in contact with the semi-conductive static charge generating element; and (c) means for measuring electrical current flowing through the conductor, wherein the flow of particles within the conduit generates a measurable electrical current through the conductor which is proportional in magnitude to the mass flow rate of particles in the conduit.

The semi-conductive, static charge-generating element (hereinafter referred to simply as the "element") can be constructed of any material which will generate and conduct static charges. Suitable materials include, for example, any common resinous plastics or polymers such as acrylics, fiberglass, polycarbonates, etc. In order to generate measurable quantities of static charges, it is preferable that the exposed surface of the element be as large as possible without substantially interfering with the flow of particles through the conduit. Hence the specific design or shape can vary. For example, a rod-like cylindrical probe can be used in those situations where it is desirable or necessary to have a device which can be inserted through the wall(s) of the conduit. Alternately, the element can take a planar shape, such as a flat sheet, which is oriented within the conduit such that the plane of the sheet is parallel to the axis of the conduit. In this manner, the surface area of the element is large, but the restriction to particulate flow is minimized. A still further alternative element design is a hollow cylinder, which can be inserted within the conduit if the diameter is smaller than that of the conduit, or which can be sized to actually replace a segment of the conduit.

The electrical conductor which carries the static charge away from the element can be of any electrically conductive material, such as copper wire, capable of removing the static charge as fast as it is created. In this regard it is preferable that the conductor be positioned on or within the element in a manner which efficiently removes the charges. For example, a single point contact between the conductor and an element having a very large surface area would probably be insufficient to drain away all of the static charges as fast as they are formed due to the large distance some of the static charges would have to travel through the semiconductor material to reach the conductor. A better design is to widely distribute the conductor over the entire surface of the element. In order to assure a good electrical connection, a preferred design has the conductor imbedded into the element just below its surface to assure instantaneous charge removal.

As mentioned, the conductor is grounded at one end, thereby causing a flow of charges through the conductor from the element to ground. Any suitable means for measuring electrical current can be used to detect this charge flow, such as an electrometer or ammeter. However, if the resistance of the electrometer is high relative to the voltage drop between the element and ground, it will be necessary to connect the nongrounded end of the conductor to a constant voltage source (V) which compensates for the resistance in the circuit due to the presence of the electrometer. This will be clearly illustrated with reference to the Drawing.

DETAILED DESCRIPTION OF THE DRAWING

Figure 1:
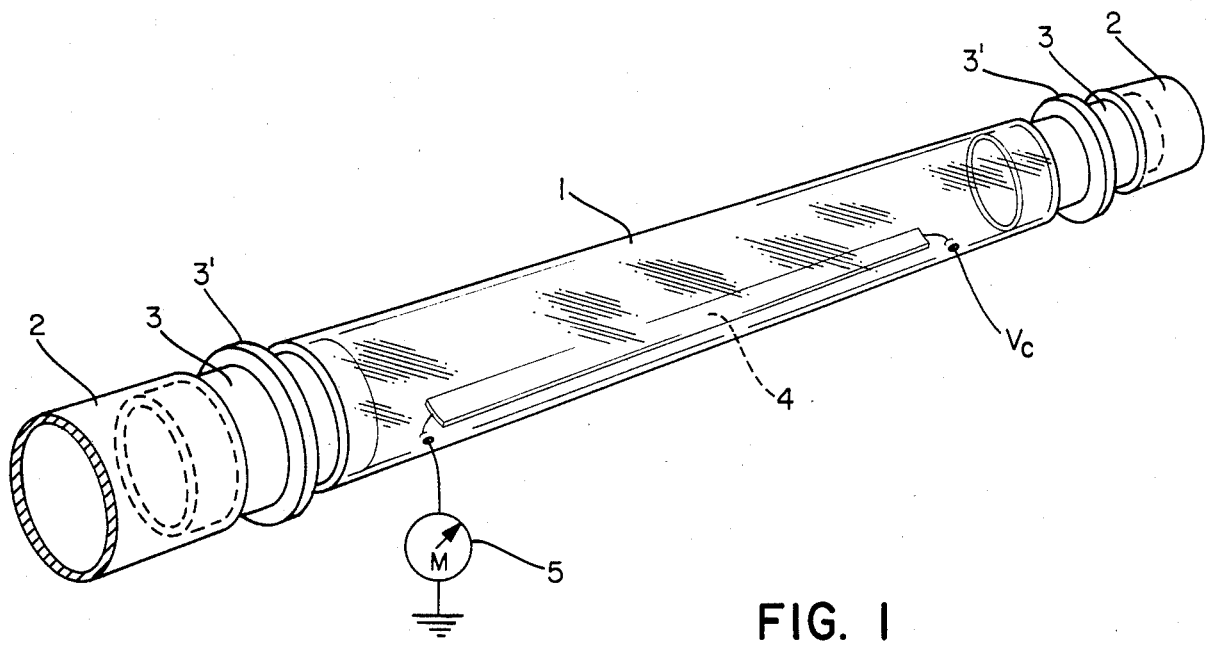
FIG. 1 illustrates one embodiment of this invention wherein the semi-conductive element is in the form of a hollow tube adapted to be inserted in-line to replace a segment of the conduit carrying the particles.

FIG. 1 illustrates one embodiment the invention wherein the element 1 is a hollow acrylic tube adapted to be inserted in-line into the conduit 2 transporting the particles. Each end of the element is provided with an electrically insulating sleeve 3 and/or flange 3' which prevents contact between the conduit 2 and the element. A suitable material for this insulator is rubber. The conductor 4, which in this embodiment is a strip of copper, is suitably secured to the inner wall of the acrylic tube and aligned parallel to the axis of the tube. The conductor is also electrically insulated from the conduit. It should be noted that the conductor can be secured to the semiconductive acrylic tube in many different configurations. It should also be noted that any substantial intrusion of the conductor into the flow path of the particles may cause material buildup upon and fouling on the conductor and result in inaccurate measurement. It is therefore preferred that the conductor be embedded into the element just below the surface. One end of the conductor is wired through an electrometer 5 to ground. The other end of the conductor is connected to a constant voltage source $V_c$ which compensates for the voltage drop in the circuit caused by the presence of the electrometer. The constant voltage source may not be necessary if the electrometer has sufficiently low resistance relative to the magnitude of the current generated by the static charges formed on the element.

In operation, as particles flow through the conduit and the acrylic tube, static charges are formed on the inner surface of the acrylic tube and are dissipated to ground by the conductor. The resulting current, which is proportional to the mass flow rate of the particles flowing through the conduit, is measured by the electrometer.

Figure 2:
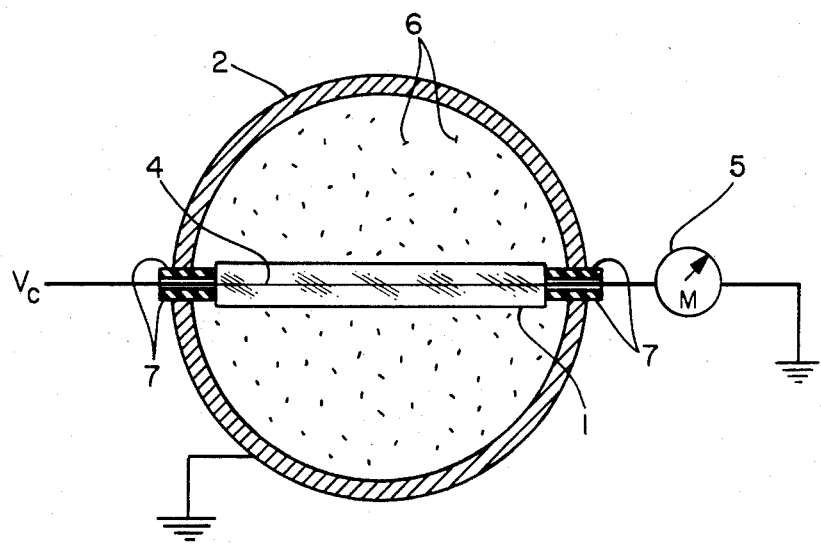
FIG. 2 is a cross-sectional view of a conduit illustrating another embodiment of this invention wherein the element is in the form of a rod inserted through the wall of the conduit carrying the particles.

FIG. 2 illustrates another embodiment of this invention in which the element 1 is in the form of an acrylic rod. Shown is a cross-section of the conduit 2 carrying particles 6. The conductor 4 is embedded in the acrylic rod. In this case the conductor is simply a copper wire which extends through opposite sides of the wall of the conduit. The element 1 does not touch the wall of the conduit and the conductor is suitably insulated from the wall of the conduit by a rubber sleeve 7. As with the embodiment of FIG. 1, the conductor is grounded at one end through an electrometer which measures current flow. The other end of the conductor is preferably wired into a constant voltage source $V_c$. If the conduit is of a material which creates or conducts static charge, it is also preferable to ground the conduit as shown in order to avoid leaking of charge from the conduit to the element.

It will be appreciated that the specific configuration of the element and conductor can vary widely from the foregoing examples, shown for purposes of illustration, without departing from the scope of this invention.

What is claimed is:

1. A device for measuring the flow of cellulosic particulates transported within a conduit by a gaseous medium comprising:
    (a) a plastic semi-conductive static charge-generating element, electrically insulated from the conduit and which replaces a portion or segment of the conduit wall, said element having a surface on which static charges are generated when exposed to the flow of particulates;
    (b) a grounded electrical conductor which is electrically insulated from the conduit and in contact with the static charge-generating element; and
    (c) means for measuring electrostatic current flowing through the conductor from the static charge-generating element to ground, wherein the flow of particulates within the conduit generates a measurable electrical current through the conductor which is proportional in magnitude to the mass flow rate of particles in the conduit.

2. The device of claim 1 wherein the static charge-generating element is a hollow cylinder having an electrical conductor embedded therein and which is adapted for having particulates flowing therethrough.

3. The device of claim 1 wherein the means for measuring the electrostatic current comprises a constant voltage source electrically connected to the grounded electrical conductor, which provides a constant voltage to the conductor to offset the voltage drop caused by the current measuring means.

4. The device of claim 1 wherein the material of the semi-conductive charge generating element is an acrylic polymer.

* * * * *